Sept. 2, 1930.   R. MACLEAN   1,774,988
MACHINE FOR MAKING PREPARED ROOFING
Filed May 1, 1926   5 Sheets-Sheet 5
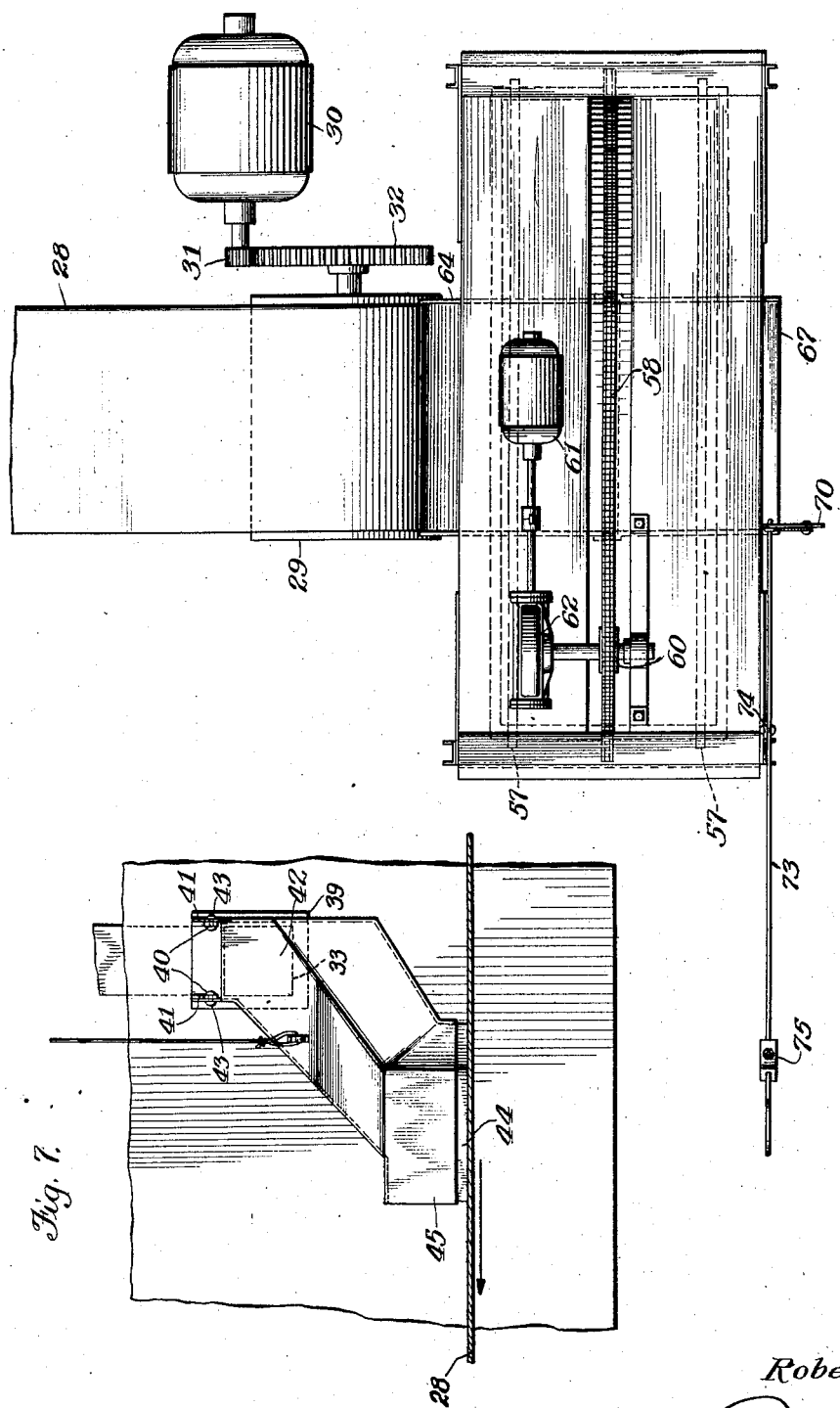
Inventor
Robert Maclean
By Pierce & Sweet
Attys.

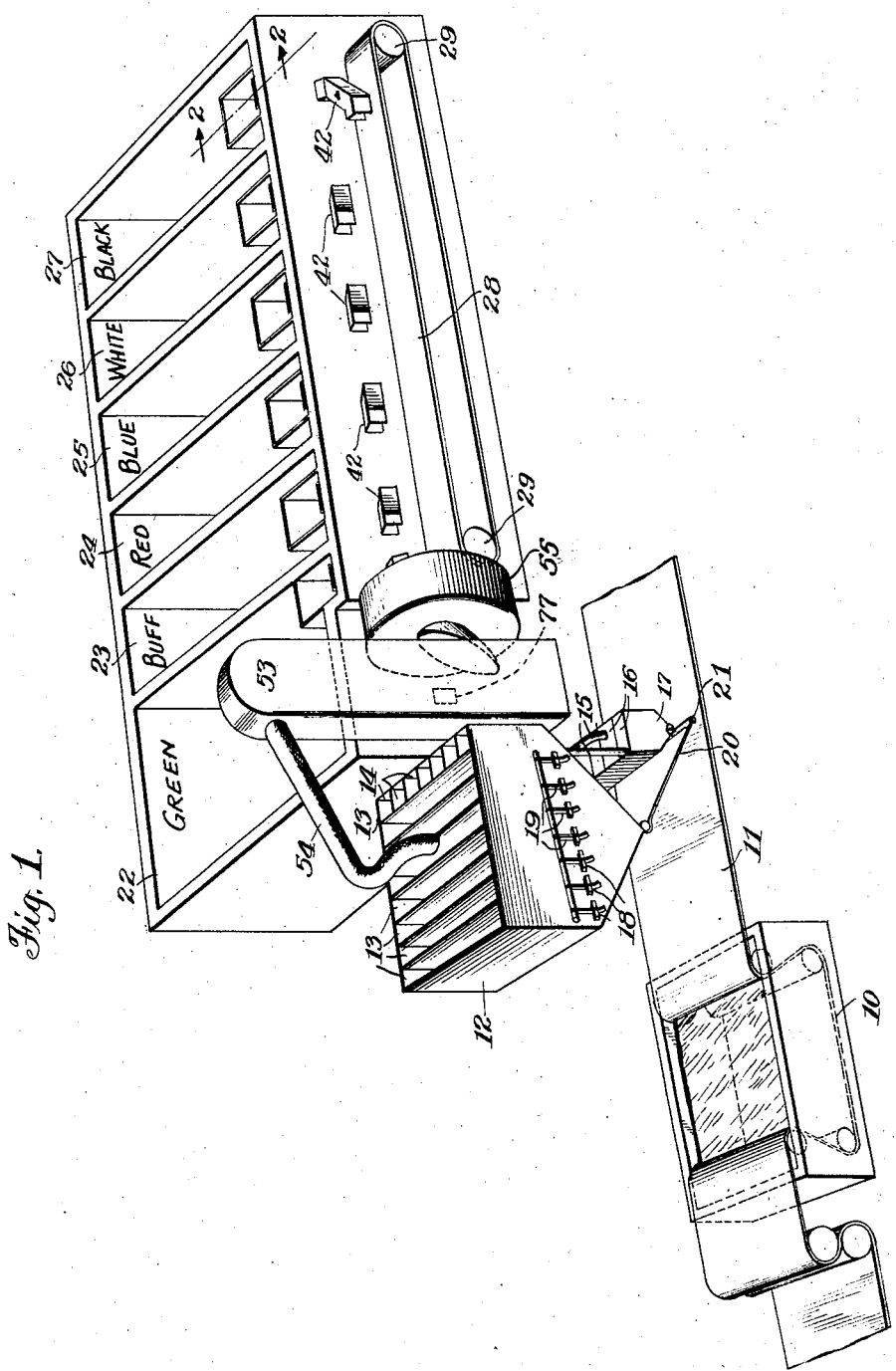

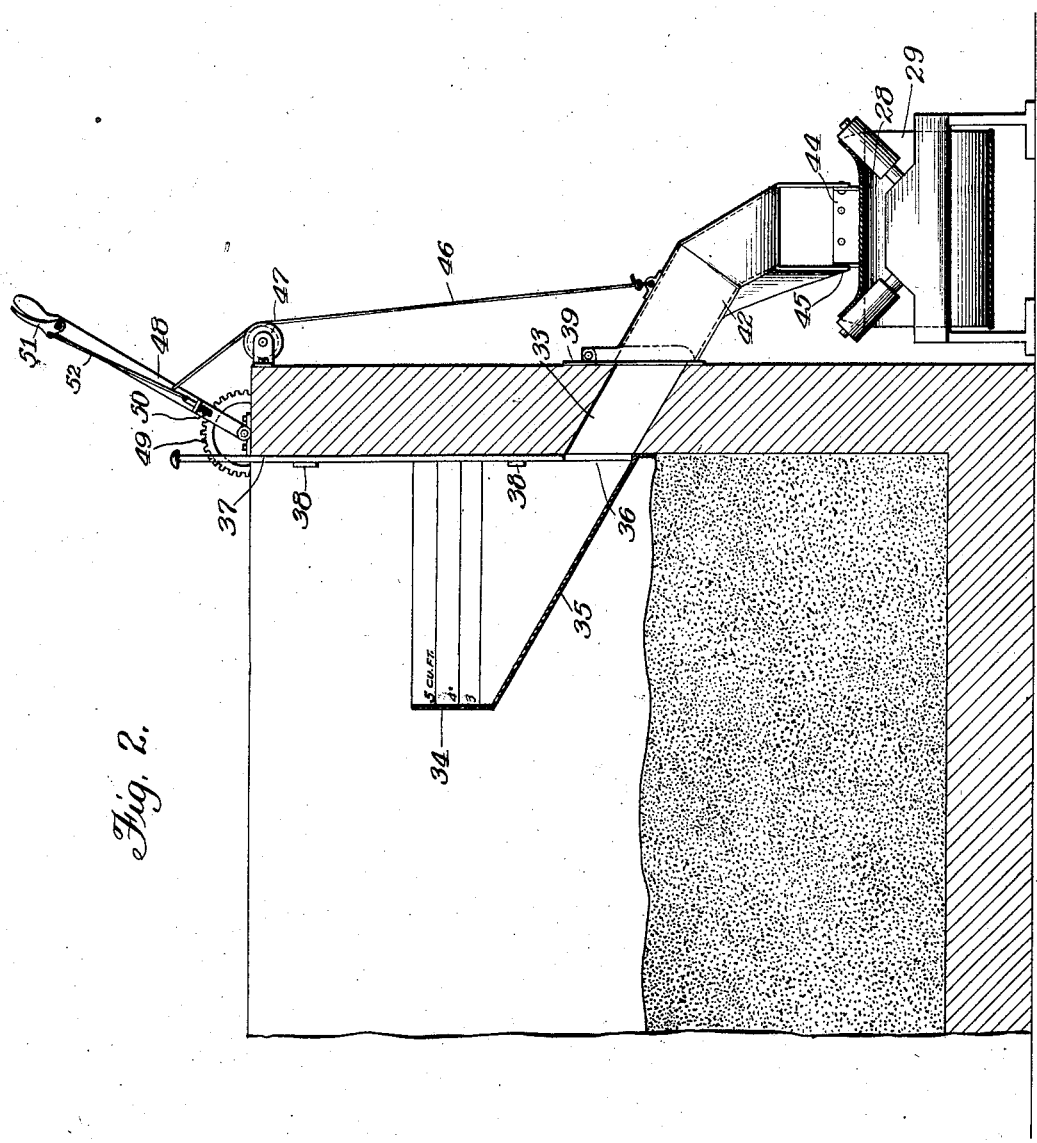

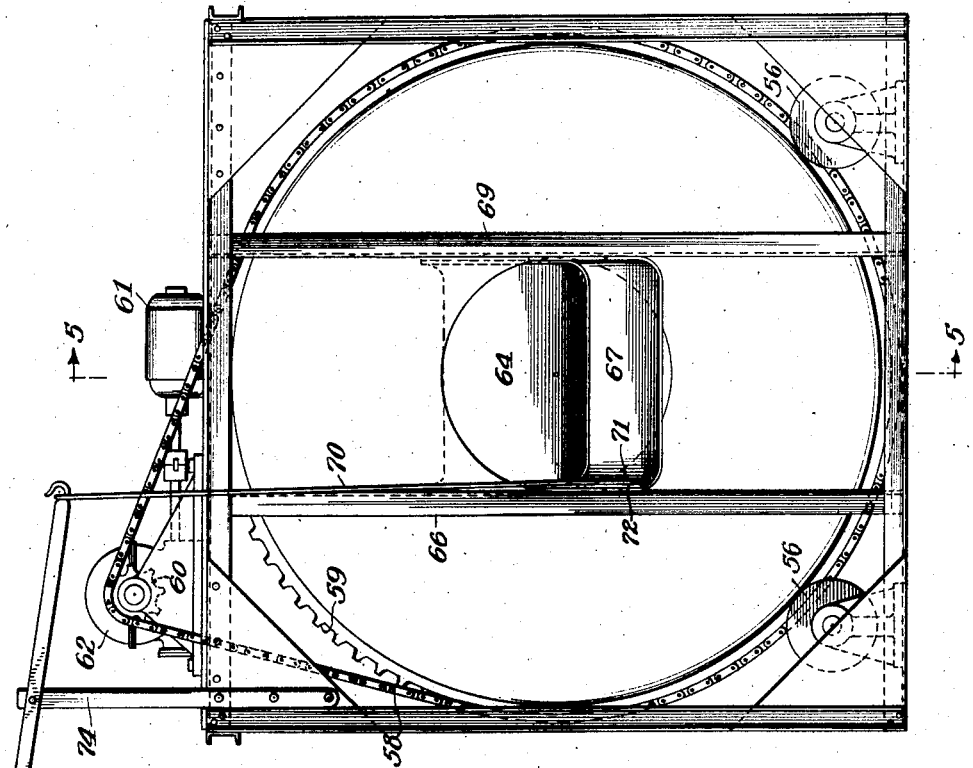
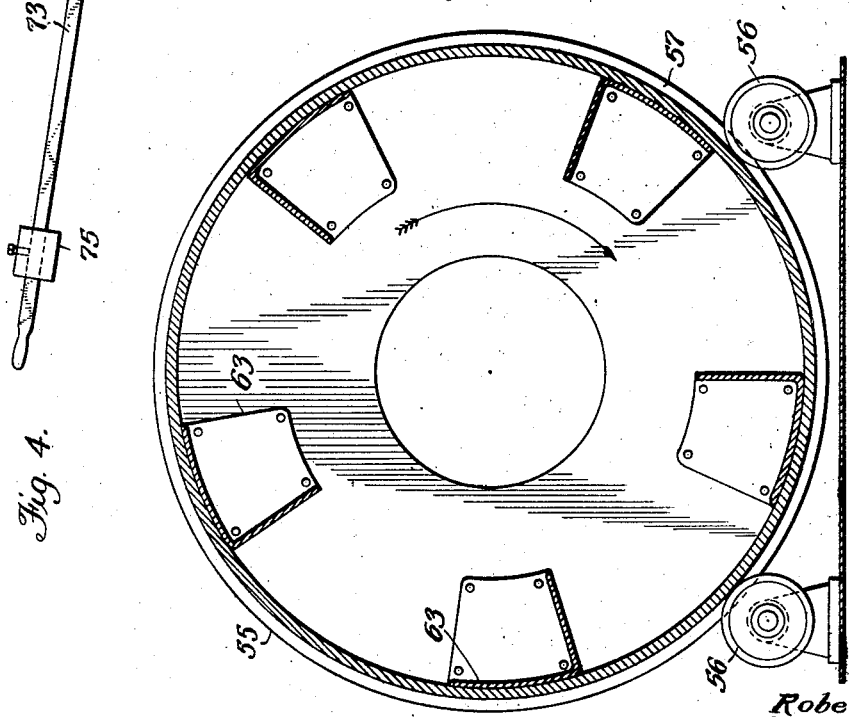

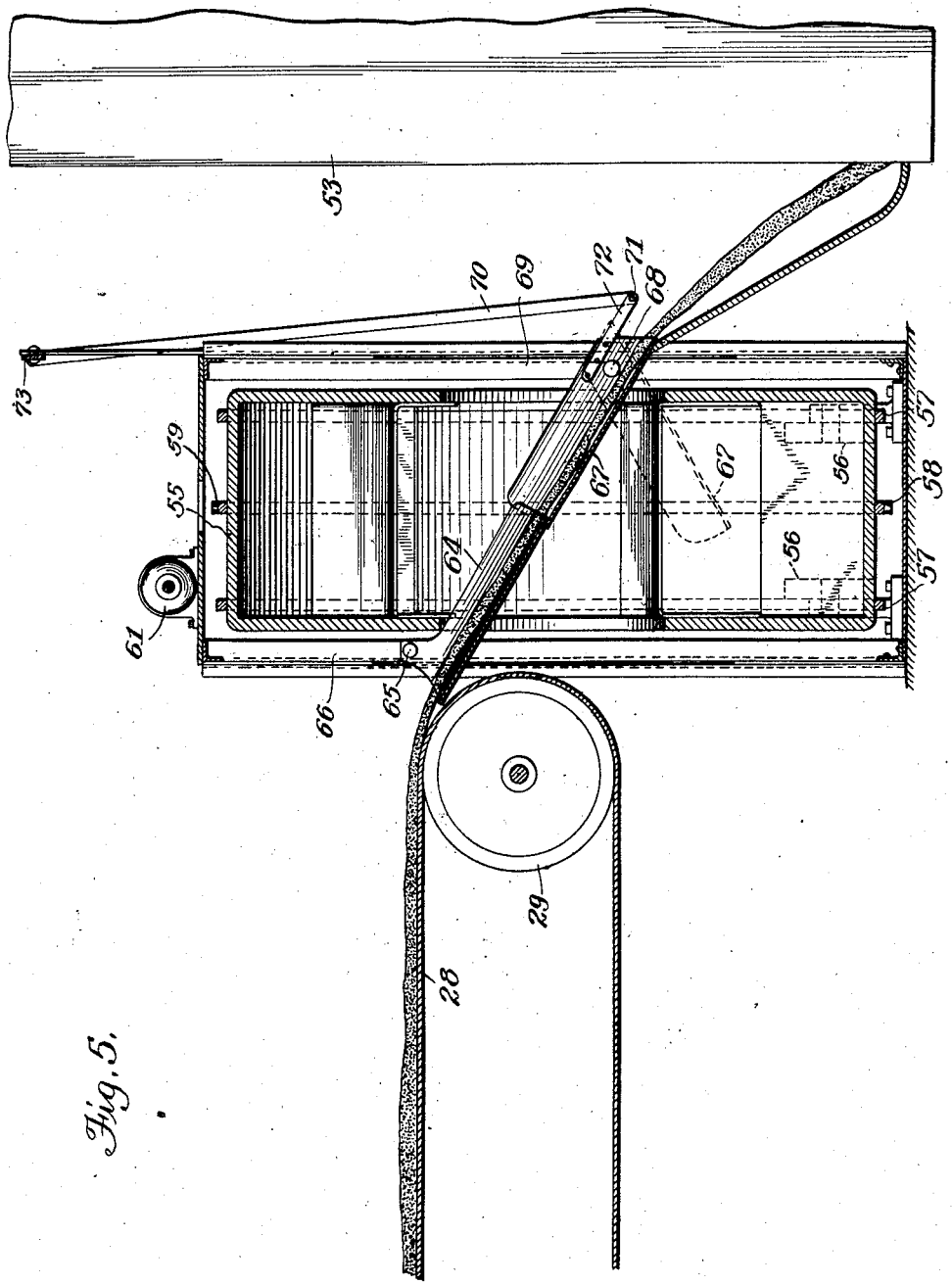

Patented Sept. 2, 1930

1,774,988

UNITED STATES PATENT OFFICE

ROBERT MACLEAN, OF CHICAGO, ILLINOIS, ASSIGNOR TO AMALGAMATED ROOFING COMPANY, OF CHICAGO, ILLINOIS, A CORPORATION OF ILLINOIS

MACHINE FOR MAKING PREPARED ROOFING

Application filed May 1, 1926. Serial No. 106,163.

My invention relates to the manufacture of prepared roofing, and includes among its objects improvements in apparatus for making such roofing, and among its advantages convenience in discharging different combinations of grits onto the roofing and in changing from one combination to another.

In the accompanying drawings:

Figure 1 is a perspective view, more or less diagrammatic, intended to show the relation between the various elements of my improved mechanism;

Figure 2 is a cross section taken on a line corresponding to line 2—2 of Figure 1, but drawn upon an enlarged scale;

Figure 3 is an end view of the mixer forming a part of my apparatus;

Figure 4 is a transverse section through the drum of the mixer;

Figure 5 is a longitudinal section through the drum, taken on line 5—5 of Fiugre 3 and showing, in addition, portions of the conveyor mechanism employed;

Figure 6 is a plan view of the mixer and certain of the associated parts; and

Figure 7 is a side elevation of one of the bins showing certain details of construction of the spout for delivering grits from the bin.

In the embodiment of the invention selected for illustration, the tank 10 holds a suitable saturant through which the strip 11 may be drawn. At 12 I have illustrated a hopper comprising a plurality of transversely extending bins 13, one of the end ones of which is divided into a plurality of smaller bins 14. Pipes 15 extend downwardly from each of the smaller bins 14 and discharge into corresponding bins 16 in the auxiliary hopper 17. Each of the bins 13 is provided at its lower end with an opening controlled by a gate 18 that can be opened by means of a suitable lever or handle 19. In a similar manner the auxiliary hopper 17 is provided at its bottom with means for controlling the discharge of grits from the bins 16. The grits from the bins 13 are fed onto the inclined chute 20 and are distributed onto the felt strip by the distributing roller 21, as are also the grits discharged from the bins 16.

For supplying the various kinds of grits to the bins 13, 14 and 16 I provide a plurality of storage bins 22, 23, 24, 25, 26 and 27 for holding the different kinds of grits. A belt conveyor 28, that may be mounted upon suitable pulleys 29 and driven by a motor 30 through suitable reduction gears 31 and 32 (see Figure 6), extends along the wall of the bins and this wall is provided with a discharge opening 33 for each of the storage bins. Inside of each storage bin is a measuring hopper 34 having an inclined bottom 35 leading to the discharge opening 33 and provided with suitable indicia for indicating the capacities of the hopper when filled to the different levels so that the workmen can accurately determine each quantity of grits that is to be fed to the conveyor. Communication between the hopper 34 and the discharge opening 33 is effected by means of a suitable gate, or valve, 36 that can be opened and closed by means of the rod 37 extending upwardly inside the hopper and guided by suitable clips 38 secured to the wall of the bin.

An apertured plate 39 surrounds the outer end of each discharge opening 33 and is suitably secured to the wall of the corresponding bin. This plate is provided with outwardly extending lugs 40 upon which are pivotally mounted the hinge lugs 41 at the inner end of the discharge spout 42, pivot pins 43 being employed for this purpose.

The discharge spout 42 is, in general, rectangular in cross section but is inclined relatively to the adjacent wall of the bin in the direction of travel of the conveyor belt, so that the grits will be moving in the direction of movement of the belt before they are discharged upon the belt, thereby tending to prevent the grits from spilling over the edges of the conveyor belt.

In order, further, to prevent any spilling of the grits, I attach a strip 44 of rubber, or other suitable flexible material, to three sides of the lower edge 45 of the spout 42 leaving the fourth side open so as to permit the grits to travel out of the spout in the direction of movement of the conveyor belt.

Since the discharge ends of the spouts 42 so closely engage the conveyor belt, it is necessary to provide means for lifting them out of the way so that they will not interfere with the transfer of grits from other bins. For this purpose I provide any suitable means for elevating these spouts, such, for instance, as a suitable cable 46, one end of which is secured to the spout and the other end of which passes over a suitable guide pulley 47 and is secured to a lever 48. To hold the lever 48 in its adjusted position I provide a suitable segmental rack 49 and a co-acting detent 50 that can be moved into and out of engagement with the rack 49 by means of the handle 51 and the link 52 in a manner well known to those skilled in this art.

At 53 I have illustrated, more or less diagrammatically, a vertically extending conveyor that terminates in a flexible conduit 54, by means of which the grits can be delivered to any one of the bins 13 or 14. The conveyor 53 may be of purely conventional construction and for this reason the details of its construction will not be further referred to. It is intended to receive the grits from the first conveyor 28 and discharge them into any one of the bins 13 or 14.

Interposed between the conveyor 28 and the conveyor 53 is a mixer comprising a drum 55 mounted upon suitable supporting pulleys 56 and held against longitudinal displacement by the rails 57. This drum is rotated by means of the sprocket chain 58 that passes around the drum and engages with the large sprocket gear 59 that surrounds the drum. A sprocket pinion 60 meshes with the chain 58 and is driven by the motor 61 through suitable reduction mechanism 62. Inside the drum are secured a plurality of lifting flights 63 adapted to trap a quantity of grits and carry them to a position adjacent the top of the drum, from which position they fall to the bottom of the drum where they are again picked up, and this operation is repeated until the grits have been satisfactorily mixed. It will, of course, be understood that by means of the measuring hoppers and the spouts described above, any quantity of any different kinds of grit can be discharged into the mixer. In order to insure the discharge of grits from the conveyor belt 28 into the mixer, I provide the latter with the chute 64 (see Figure 5) that is pivoted at 65 upon a suitable angle iron support 66. The outer end of this chute is positioned so as to receive the discharge from the conveyor belt 28 and drop it to the bottom of the drum 55.

For the purpose of withdrawing the grits from the drum 55 when they have been sufficiently mixed, I provide a second chute 67 that is also pivotally mounted, as shown at 68, upon the angle iron support 69, and which may be tilted from the position shown in full lines in Figure 5 to the position shown in dotted outline in the same figure. This tilting can be accomplished through the link 70, the lower end of which is pivotally connected at 71 with an arm 72 projecting from the chute and the upper end of which is pivotally connected with the lever 73 that is pivotally mounted intermediate its ends upon the bracket 74. A counterweight 75, adjustably mounted upon the lever 73, provides means for holding the chute 67 in the position shown in dotted outline.

When the two chutes 64 and 67 occupy the position shown in full line in Figure 5, the mixer drum is bypassed, that is, the grits pass from the conveyor 28 to the conveyor 53 without being mixed. This operation is facilitated by a suitable hopper 76 that conducts the grits from the chute 67 to the lower end of the conveyor 53. When it is desired to mix the grits discharged from the conveyor 28, the lever 73 is moved to position the chute 67, as shown in dotted outline in Figure 5, whereupon the grits discharged from the chute 64 drop downwardly, first striking the inner end of the chute 67 and then falling into the bottom of the drum 55. The latter performs its mixing operation and when the chute 67 is returned to the position shown in full lines the mixed grits are delivered to the bottom of the conveyor 53.

From the above description it will be apparent that the operators in charge of my improved mechanism can select any desired quantity of any of the grits and discharge them onto the conveyor 28. If it is desired to coat the strip 11 with a single color, these grits are conveyed by the conveyor 28, the two chutes 64 and 67, the conveyor 53 and the terminal spout 54 directly to one of the bins 13. By manipulating the proper lever 19, the operators can cause the grits to be discharged properly upon the strip 11. If it is desired to produce roofing coated with a mixture of two or more colors, the operators deliver the proper quantity of grits of each color upon the conveyor 28 and manipulate the lever 73 to depress the chute 67, whereupon these grits are delivered into the mixer. When they have been sufficiently mixed, the chute 67 is elevated, and the mixed grits discharged into the conveyor 53 and delivered into one of the bins 13. If it is desired to coat the strip with stripes of different colored grits, these grits are separately delivered by the conveyors 28 and 53 and deposited into the bins 14, from whence they are fed to the bins 16 and then discharged onto the strip. If it is desired to form the stripes on the roofing from mixtures of different grits, the desired colors can be mixed before being conveyed to the bins 14. Sometimes, it is desired to modify, or soften, the effect produced by the stripes of mixed grits and this can be accomplished by discharging grits over the entire width of the strip from one of the bins 13 and the grits thus supplied to the strip may be either of one color or a mixture of different colors.

At 77 I have disclosed a discharge opening through which grits may be discharged directly from the adjacent bin into the conveyor 53. This opening is preferably formed in the bin holding that character of grits which are used in the largest quantities. At the present time, green grits are in the greatest favor with architects, and for that reason I have shown this opening located in the storage bin for holding green grits. By permitting these grits to be discharged directly into the conveyor 53, very considerable wear upon the belt 28 is avoided.

From the above description it will be apparent that I have provided a machine that is adaptable to the production of numerous types and colors of roofing; and that the operations required for producing any one type of roofing, or for changing from one type of roofing to another, are reduced to a minimum; and it is equally apparent that the change from one type of roofing to another is accompanied by a minimum loss in time and materials.

While I have described the details of construction of the preferred embodiments of my invention, it is to be clearly understood that my invention is not limited to these details, but is capable of other adaptations and modifications within the scope of the appended claims.

Having thus described my invention, what I claim is:

1. The combination with a roofing coating machine comprising means for advancing a strip of roofing material, a hopper comprising a plurality of bins for holding different kinds of grits, and means for selectively controlling the discharge of grits from said bins onto said strip, of means for supplying the different kinds of grits to said bins comprising a first conveyor, a plurality of storage bins, each provided with means for discharging measured quantities of grits onto said conveyor, a second conveyor for receiving grits from said first conveyor and terminating in means for discharging said grits into any one of said first named bins, and a mixer interposed between said first and second conveyors.

2. The combination with a roofing coating machine comprising means for advancing a strip of roofing material, a plurality of bins for holding different kinds of grits, and means for selectively controlling the discharge of grits from said bins onto said strip, of means for supplying the different kinds of grits to said bins comprising a first conveyor, a plurality of storage bins, each provided with means for discharging quantities of grits onto said conveyor, a second conveyor for receiving grits from said first conveyor and for discharging said grits into any one of said first named bins, and a mixer interposed between said first and second conveyors.

3. The combination with a roofing coating machine comprising means for advancing a strip of roofing material, a plurality of bins for holding different kinds of grits, and means for selectively controlling the discharge of grits from said bins onto said strip, of means for supplying the different kinds of grits to said bins comprising a first conveyor, a plurality of storage bins, each provided with means for discharging measured quantities of grits onto said conveyor, a second conveyor for receiving grits from said first conveyor and for discharging said grits into any one of said first named bins, and a mixer interposed between said first and second conveyors.

4. The combination with a roofing coating machine comprising means for advancing a strip of roofing material, a plurality of bins for holding different kinds of grits, and means for controlling the discharge of grits from said bins onto said strip, of means for supplying the different kinds of grits to said bins comprising a first conveyor, a plurality of storage bins, each provided with means for discharging quantities of grits onto said conveyor, and a second conveyor for receiving grits from said first conveyor and for discharging said grits into any one of said first named bins.

5. Means for supplying grits to a roofing coating machine comprising a first conveyor, a plurality of bins arranged along said conveyor, each having a wall provided with an opening, a measuring device supported adjacent each opening for discharging measured quantities of each of the different kinds of grits onto said conveyor, a second conveyor, a mixing mechanism interposed between said first and second conveyor, for receiving grits from said first conveyor, mixing said grits and delivering them to said second conveyor, said mixing mechanism comprising means that in one position directs grits from said first conveyor into said mixing mechanism and in another position discharges grits from said mixing mechanism onto said second conveyor.

6. Means for supplying grits to a roofing coating machine comprising a first conveyor, a plurality of bins arranged along said conveyor, each having a measuring device for discharging measured quantities of each of the different kinds of grits onto said conveyor, a second conveyor, a mixing mechanism interposed between said first and second conveyors for receiving grits from said first conveyor, mixing said grits and delivering them to said second conveyor, said mixing mechanism comprising means that in one position directs grits from said first conveyor into said mixing mechanism and in another position discharges grits from said mixing mechanism onto said second conveyor.

7. Means for supplying grits to a roofing coating machine comprising a first conveyor, a plurality of bins arranged along said conveyor, each having a measuring device for discharging measured quantities of each of the different kinds of grits onto said conveyor, a second conveyor, a mixing mechanism interposed between said first and second conveyors for receiving grits from said first conveyor, mixing said grits and delivering them to said second conveyor.

8. Means for supplying grits to a roofing coating machine comprising a first conveyor, a plurality of bins arranged along said conveyor, each having a device for discharging quantities of each of the different kinds of grits onto said conveyor, a second conveyor, and means for conveying grits from said first conveyor to said second conveyor comprising a mixing mechanism.

9. The combination with a roofing coating machine comprising means for advancing a strip of roofing material, a plurality of bins for holding different kinds of grits, and means for selectively controlling the discharge of grits from said bins onto said strip, of means for supplying the different kinds of grits to said bins comprising storage means for separately holding said different kinds of grits, and common means for delivering grits from any one of said storage means to any one of said bins, including means for mixing the grits from two or more of said storage means.

10. The combination with a roofing coating machine requiring delivery of grits in small quantities during operation thereof, of a set of small bins, means for feeding material continuously from said bins onto a strip of roofing material, a set of large storage bins filled with different kinds of material, and continuously operative selective means for replenishing any small bin from any storage bin.

11. The combination with a roofing coating machine requiring delivery of grits in small quantities during operation thereof, of a set of small bins, means for feeding material continuously from said bins onto a strip of roofing material, a set of large storage bins filled with different kinds of material, and selective means for replenishing any small bin from any storage bin.

In witness whereof, I hereunto subscribe my name this 28th day of April, 1926.

ROBERT MACLEAN.